United States Patent [19]

Hanlon et al.

[11] Patent Number: 5,833,525
[45] Date of Patent: Nov. 10, 1998

[54] APPARATUS AND METHOD FOR FORMING SAUSAGE LINKS

[75] Inventors: Allan James Hanlon, Stirlingshire; Tom Saddler Lynch, Uddingston; Derek Samuel David Norwood, Kilwinning, all of United Kingdom; Frederikus Johannes Brink, Veenedaal; Jan Schipper, Barneveld, both of Netherlands

[73] Assignee: Devro PLC, United Kingdom

[21] Appl. No.: 535,133

[22] PCT Filed: Apr. 15, 1994

[86] PCT No.: PCT/GB94/00794

§ 371 Date: Feb. 12, 1996

§ 102(e) Date: Feb. 12, 1996

[87] PCT Pub. No.: WO94/23584

PCT Pub. Date: Oct. 27, 1994

[30] Foreign Application Priority Data

Apr. 15, 1993 [GB] United Kingdom ............... 930777

[51] Int. Cl.[6] .................................................. A22C 11/10
[52] U.S. Cl. ............................................................ 452/48
[58] Field of Search ................................. 452/48, 47, 46

[56] References Cited

U.S. PATENT DOCUMENTS

1,545,813  7/1925  Clos .................................. 452/47
2,356,099  8/1944  Swoboda, Sr. .................... 452/47
2,663,982  12/1953  Conti ............................... 452/48

*Primary Examiner*—Willis Little
*Attorney, Agent, or Firm*—Gifford, Krass, Groh, Sprinkle, Patmore, Anderson & Citkowski, P.C.

[57] ABSTRACT

Apparatus for forming a chain of sausage links is described in which the formed links are less likely to unwind. The apparatus includes a conveyor (10) for moving a tubular food casing (18) filled with a food emulsion around an axis (12), the conveyor having a plurality of crimping (14a–h) and twisting (15a–h) means for forming a continuous adjacent links. The conveyor (10) moves the links through a semicircular path past station (A–I) where twisting and crimping operations are performed. The links so formed have a first set twisted in one direction about the tubular food casing axis and a second set of adjacent links twisted in the opposite direction. The twisted links are then fed to apparatus (90) for arranging the twisted sets of links in vertical hanging loops (91) using a screw thread (104) of variable decreasing pitch with clamps (96) for clamping between the oppositely twisted sets of links so that as the twisted links move along the screw thread (104), oppositely twisted sets of links form hanging loops which have little tendency to unwind.

11 Claims, 9 Drawing Sheets

APPARATUS AND METHOD FOR FORMING SAUSAGE LINKS

BACKGROUND OF INVENTION

This invention relates to an apparatus and a method for forming a chain of sausage links from a tubular casing filled with a food emulsion, and further to a chain of sausage links produced by the apparatus and method of the invention. The invention also relates to an apparatus for arranging a longitudinal chain of sausage links in hanging loops.

Sausage links are produced by pinching and/or twisting a tubular casing filled with a food emulsion. The casing may either be extruded with the emulsion or a preformed casing may be filled with emulsion. Individual sausages may be formed using a method and apparatus such as described in European Patent Nos. 69544 and 139333. In the disclosed apparatus a number of forming arms are radially mounted on a circular plate and are capable of being moved into an open or closed position as they are rotated around a stationary shaft upon which is mounted a pair of cams. There are cam followers associated with each of the forming arms to move the forming arms to open and close in a manner determined by the shape of the cam. Stuffed sausage casing is fed tangentially to the apparatus and is received into the space defined by a pair of open forming arms and, as the forming arms are carried around the centre line of the plate, the cams force the forming arms together forming individual sausage links. Once a sausage is formed, the cam is shaped to move the arms closer together to sever the casing between the individual sausages.

If it is desired to form a chain of sausage links it is preferable that adjacent links are rotated about their longitudinal axis relative to one another to form twisted casing portions between the links and thus better maintain the integrity of the individual links. Sausage linking apparatus suitable for this purpose is manufactured by Famco, the Famco sausage linkers incorporating splined rollers or belts which produce the twist between the links by turning adjacent links in opposite directions. The roller mechanism and the pincher assemblies, which hold the sausage and form the link shapes, are both attached to a continuous roller chain. The roller mechanism engages a horizontal rack and is driven by the movement of the chain along the rack.

The chain of sausage links produced using the Famco apparatus is generally sufficient for producing links which will, for example, be laid out in a shallow tray for storage and sale, as the friction between the tray surface and between adjacent links prevents the links from untwisting. However, if the links are to be cured or smoked, for example, the links are typically hung in loops; in this arrangement, the twisted casing portions between the links tend to unwind resulting in the integrity of the individual links being lost.

BRIEF SUMMARY OF THE INVENTION

One of the objects of the present invention is to provide a method and an apparatus for forming a chain of sausage links which is less likely to unwind.

According to the present invention there is provided an apparatus for forming a chain of sausage links from a tubular casing filled with a food emulsion, the apparatus comprising conveyor means including a plurality of pinching means for closing on the casing to form individual links and a plurality of twisting means for rotating the filled casing about a longitudinal axis relative to adjacent links to form twisted casing portions between the links, characterised in that the twisting means are arranged to rotate a first set of a plurality of adjacent links in one direction and a following second set of adjacent links in an opposite direction.

According to a further aspect of the present invention there is provided a method of forming a chain of sausage links from a tubular casing filled with a food emulsion, the method comprising the steps of: pinching the casing at spaced intervals to form individual links; and rotating the filled casing about a longitudinal axis relative to adjacent links to form twisted casing portions between the links, characterised in that a first set of a plurality of adjacent links is rotated in one direction and a following second set of adjacent links is rotated in an opposite direction.

These aspects of the present invention allow production of a chain of sausage links which is less likely to unwind than the chains produced with conventional apparatus and methods, particularly where the chain is to be hung in loops, following forming, for unloading or further processing such as freezing, curing, smoking, cooking and the like. Conveniently, sets of even numbers of adjacent links, preferably four, will be twisted in alternate directions, to facilitate hanging of the chain in loops.

Preferably, the conveyor means defines a continuous path and most preferably, for compactness, defines a circular path, the pinching and twisting operations preferably being completed on movement of the conveyor means through 180 degrees.

Most preferably, the pinching means are in the form of pinching arms arranged to open and close to receive, pinch and then release a portion of filled casing. The arms may include cam followers which cooperate with cams configured to provide a desired arm configuration at an appropriate point on the path followed by the conveyor means. A plurality of cams of different profile may be provided and each set of pinching arms may be provided with cam followers arranged to follow a respective cam. This arrangement permits the provision of pinching arms having different opening and closing sequences to suit the different requirements of the twisting operations carried out on the first and second sets of links.

The present invention also relates to a chain of sausage links produced by the apparatus and method described above.

According to a still further aspect of the present invention there is provided apparatus for arranging a longitudinal chain of sausage links in substantially vertical loops, the apparatus comprising a conveyor means including a plurality of support means arranged at spaced locations to receive the chain of sausage links at a loading station, the support means being arranged to move closer together as the support means moves from the the loading station such that the lengths of sausage between the supported locations form hanging loops.

This aspect of the present invention may be used to in conjunction with the other aspects of the invention described above or may be used with conventional sausage linkers.

Preferably, the conveyor means includes a screw arrangement for movably mounting the support means, rotation of the screw producing longitudinal movement of the support means. Most preferably, the screw has a thread of variable pitch to effect the variable spacing of the support means.

Preferably also, the conveyor means includes clamp means arranged at spaced locations to clamp portions of the chain of sausages at the loading station to prevent unwinding of links which have been twisted relative to adjacent links. For use with the other aspects of the present invention described above, the clamp means are preferably arranged to clamp adjacent the twisted casing portions between the oppositely twisted sets of links.

Preferably also, the clamp means are located on the conveyor means between the support means. Most preferably, the conveyor means includes a flexible link, such as a chain, and the support means and the clamp means are mounted on the flexible link. It is preferred that the support means and clamp means are arranged such that a clamp means is clamped to the portion of the sausage chain which forms the lower part of each the hanging loops.

BRIEF DESCRIPTION OF DRAWINGS

These and other aspects of the present invention will now be described, by way of example, with the reference to the accompanying drawings in which.

DETAILED DESCRIPTION OF INVENTION

Figures 1A, 1B, 1C, 1D, 1E:
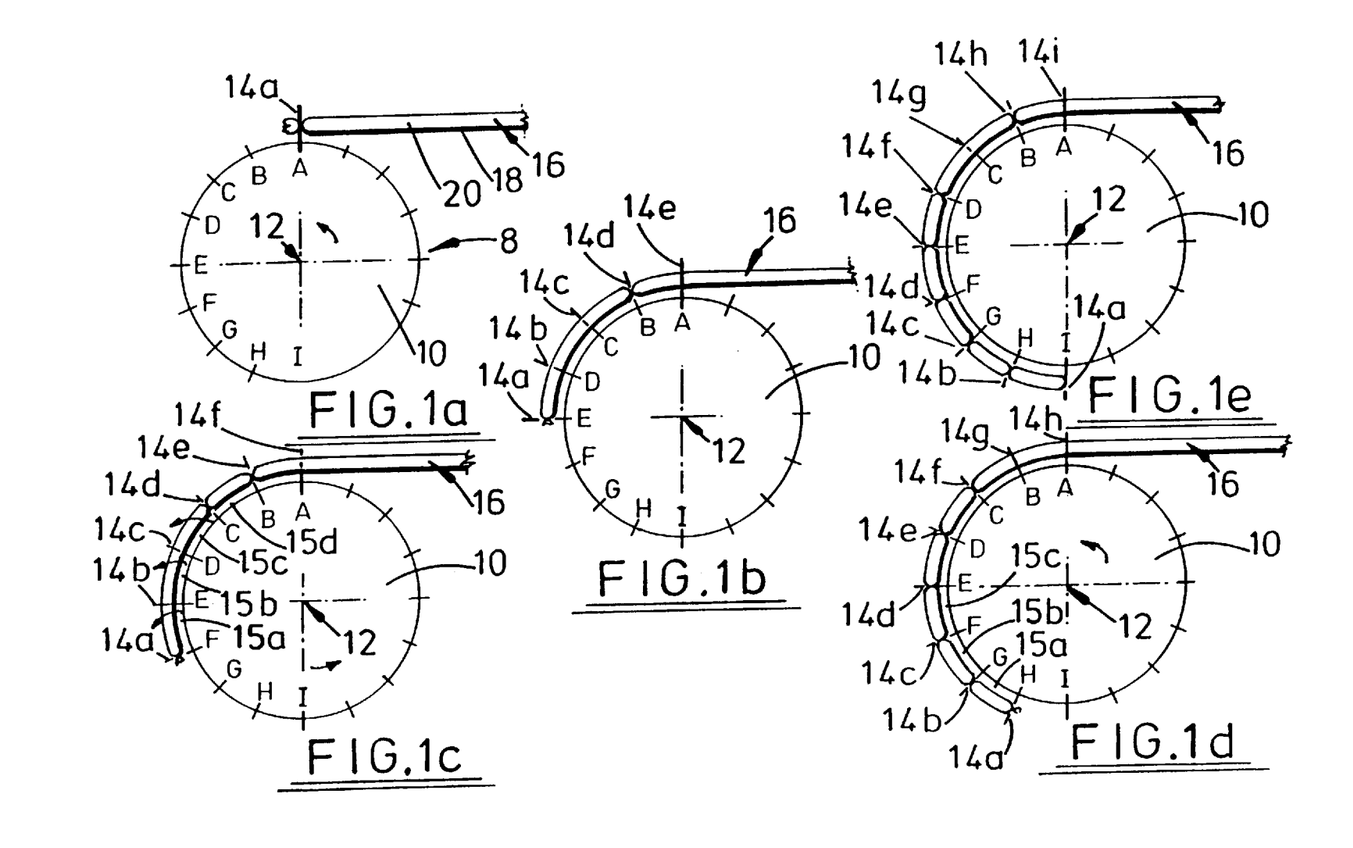
FIGS. 1a to 1e illustrate, somewhat schematically, steps of a method of forming a chain of sausage links in accordance with a preferred embodiment of the present invention, carried out on an apparatus in accordance with a preferred embodiment of a further aspect of the present invention.

Reference is first made to FIGS. 1a to 1e, which illustrate, somewhat schematically, an apparatus 9 for forming a chain of sausage links. The apparatus includes conveyor means in the form of a mounting plate 10 which is driven to rotate about an axis 12. Mounted radially at the edge of the plate 10 are a plurality of pinching means in the form of pinch arm assemblies 14a–h and twisting means in the form of roller assemblies 15a–h. As will be described, as the plate 10 rotates the pinch arms and rollers are operated to form a rope of sausage into a chain of sausage links. This process will first be described as a series of steps as the plate 10 rotates, with reference to various angularly spaced locations, designated by eight letters A to I. Reference is first made to FIG. 1a, which shows a rope of sausage 16 comprising a tubular casing 18 filled with a food emulsion 20, being presented to the open pinch arms 14a at station A, which then close to pinch the end of the rope. The wheel then rotates with the rope 16 being drawn around the plate 10, into the open pinch arms as they pass station A. From station A, pinch arms 14b and 14c first close completely then only partially to retain but not pinch the rope, while pinch arms 14d immediately close fully onto the sausage 16 on passing station A. On the pinch arms 14a reaching station E, as illustrated in FIG. 1b, the sausage 16 is being received by open pinch arms 14e. On rotation of the plate 10 to bring the pinch arms 14a to station F, as shown in FIG. 1c, the pinch arms 14e have closed fully to pinch the sausage 16 and the roller mechanism 15a, 15b and 15c has been activated to turn the sausage to form twists in the sausage rope at pinch arms 14a and 14d. Following further rotation of the plate 10 to bring the pinch arms 14a to station H, as shown in FIG. 1d, the rollers 15a and 15c have stopped rotating, pinch arms 14b and 14c have closed fully on the sausage 16 while roller 15b continues to rotate forming twists in the casing at pinch arms 14b and 14c. Thus, the first set of four links have all been twisted relative to one another in the same clockwise direction. After rotation to station I, as shown in FIG. 1e, the pinch. arms 14a open to release the sausage rope 16 onto a second conveyor (not shown). At this position pinch arms 14e are in the same position as pinch arms 14a were as shown in FIG. 1b, and the second set of four links between pinch arm 14e and 14i are then subject to the same pinching and twisting operations as the four preceding links, but with the sausage rope 16 being rotated in the opposite, clockwise direction.

Figure 2:
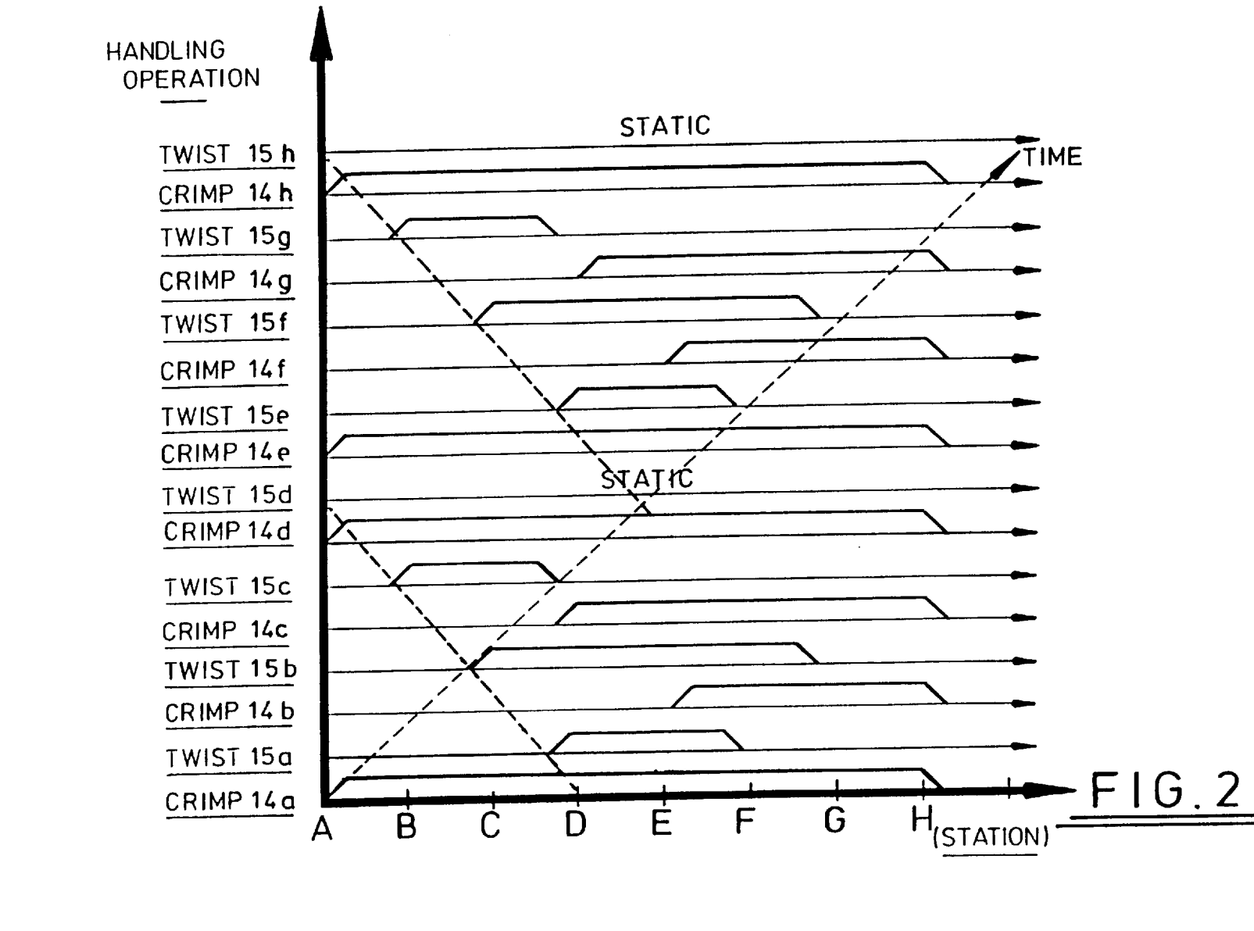
FIG. 2 is a graph illustrating the timing of the twisting and crimping steps of FIGS. 1a to 1e and the operating conditions of parts of the apparatus of FIGS. 1a to 1e.

FIG. 2 of the drawings illustrates a timing graph of the crimping and twisting operations of the pinch arms and roller assemblies at each of the stations A to I of the mounting plate 10. The diagonal bands defined by the chain-dotted lines, along the time axis t, extending upwardly from right to left indicate the condition of each pinch arm and roller assembly with rotation of the plate 10.

Figure 3A:
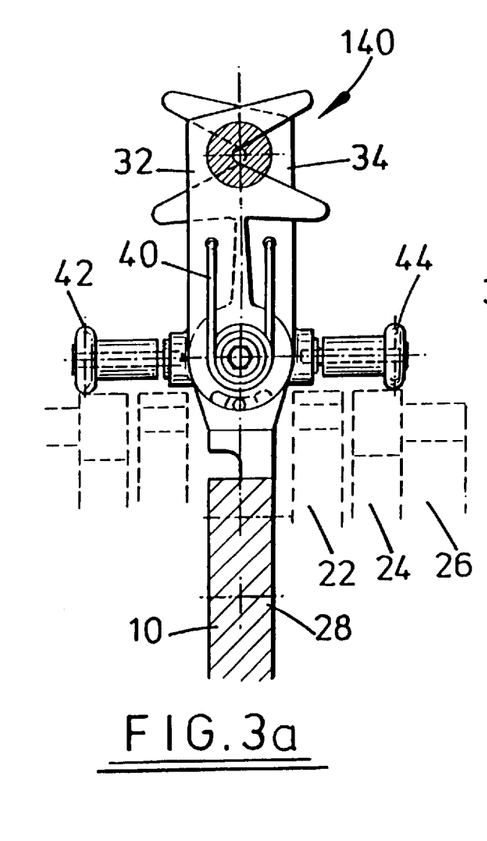
FIGS. 3a, 3b and 3c are views of a pinch arm assembly of the apparatus of FIGS. 1a to 1e.
Figure 3B:
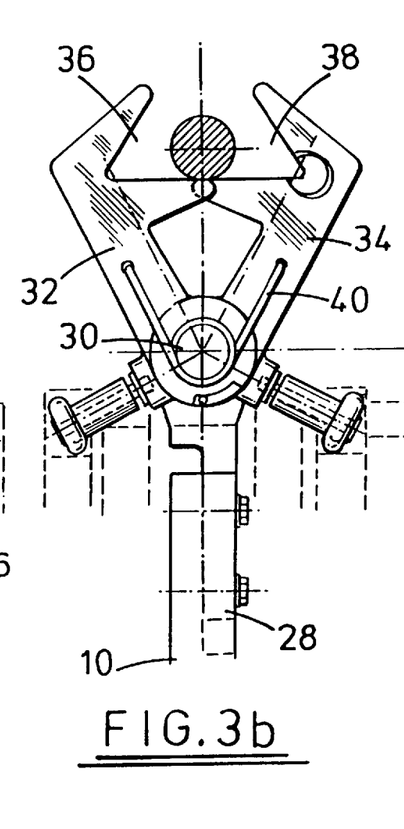
Figure 3C:
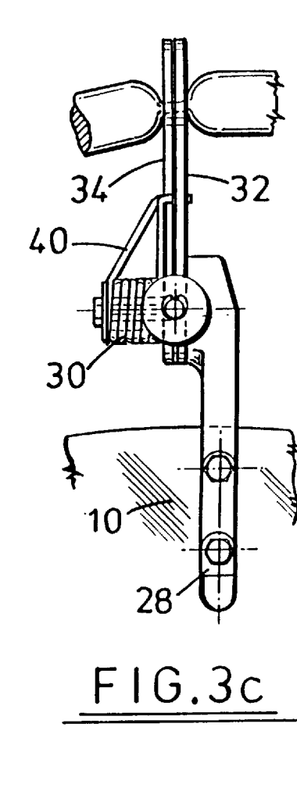

Reference is now made to FIGS. 3a, 3b and 3c of the drawings which illustrate the pinch arm assembly 14a. The Figures also illustrate three pairs of cams 22, 24 and 26 which operate the various pinch arm assemblies, the pinch arm assembly 14a being operated by the middle pair of cams 24. The assembly 14a includes a mounting bracket 28 which is fixed to the plate 10. The bracket 28 includes an axle 30 on which a pair of arms 32, 34 are pivotally mounted. The arms 32, 34 define opposing jaws 36, 38 which may be open to receive the rope of sausage 16, as shown in FIG. 3b, or closed to pinch the rope to create an individual link, as shown in FIGS. 3a. The arms 32, 34 are biased to the open position by a spring 40 mounted on the axle 30, the arms being pushed to the closed position by cam followers 42, 44 which ride on the cams 24.

Figure 4A:
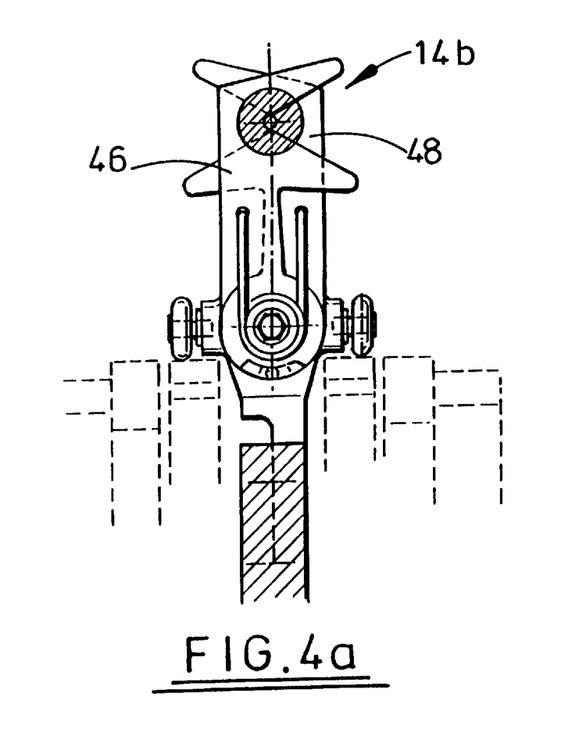
FIGS. 4a and 4b are views of a further pinch arm assembly of the apparatus of FIGS. 1a to 1e.
Figure 4B:
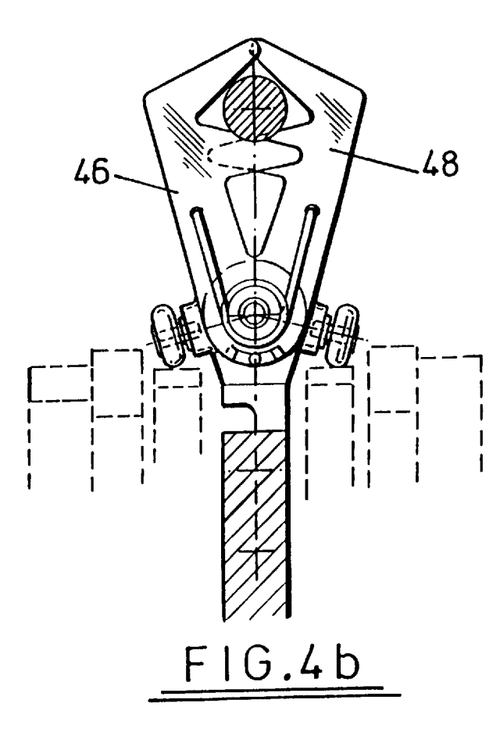

Reference is now made to FIGS. 4a and 4b of the drawings which show the pinch arm assembly 14b which cooperates with the middle inner pair of cams 22 and which has arms 46, 48 which, by virtue of the profile of the cams 22, may be open to receive the rope of sausage 16 at station A, fully closed to pinch the sausage between stations E and H or, as shown in FIG. 4b, partially closed between stations A to E to hold the sausage 16 on the plate 10, without crimping.

From FIG. 2 it can be seen that pinch arms 14a, 14d, 14e and 14h follow the one pair of cams 24, while pinch arm 14b and 14f follow cams 22, and the other arms 14c and 14g follow the outer pair of cams 26.

Figure 5A:
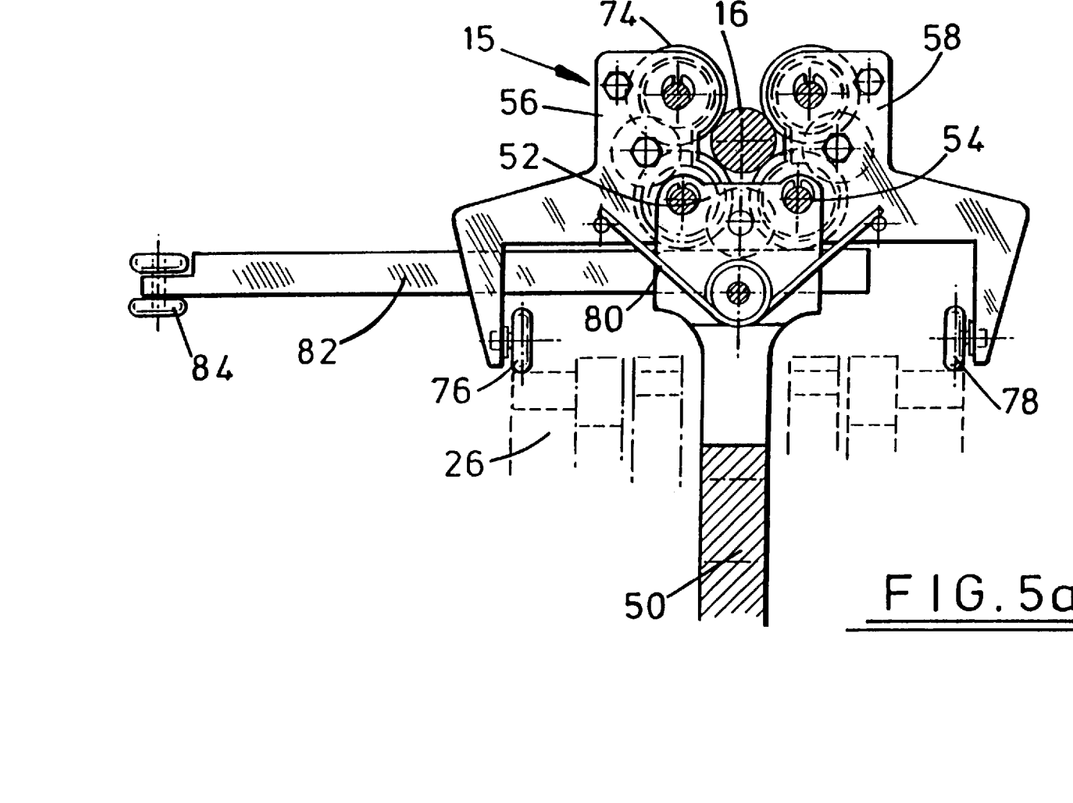
FIG. 5a, 5b and 5c are various views of a roller assembly of the apparatus of FIGS. 1a to 1e.
Figure 5B:
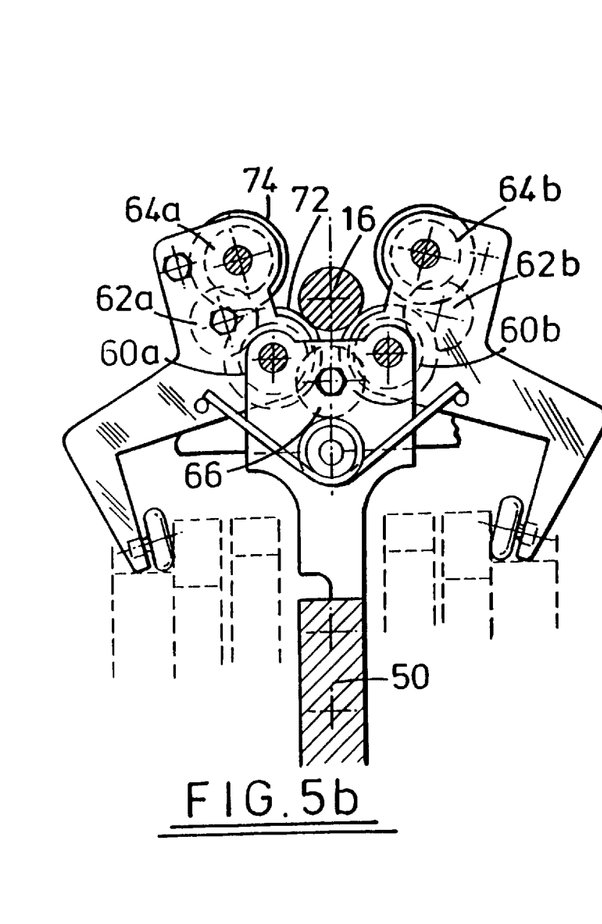
Figure 5C:
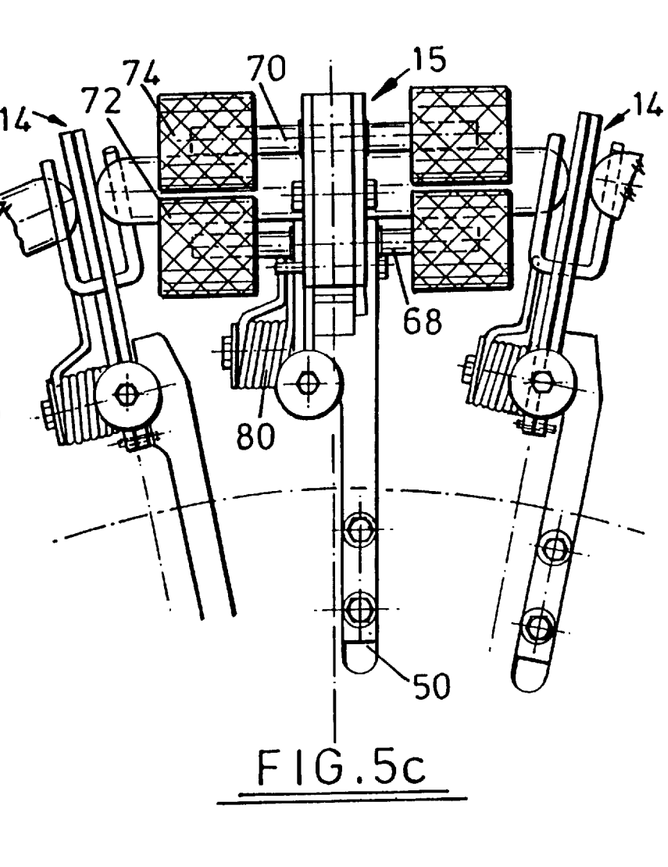

Reference is now made to FIGS. 5a, 5b and 5c of the drawings, which illustrate one of the roller assemblies 15a. Like the pinch arm assembly 14a, the roller assembly 15a is provided with a mounting bracket 50 for attachment to the plate 10. The bracket 50 provides mounting for a pair of axles 52, 54 on which a pair of arms 56, 58 are pivotally mounted. Each arm 56, 58 provides mounting for three gear wheels 60, 62, 64, a further single gear wheel 66 being mounted on the bracket 50. The gear wheel 66 engages with both gear wheels 60a, 60b, which in turn engage with respective gear wheels 62a, 62b, which in turn engage with gear wheels 64a, 64b. The gears 60a, 60b, 64a, 64b are each provided with long axles 68, 70 which extend beyond the respective arms 56, 58 to provide mounting for pairs of rollers 72, 74.

Each arm 56, 58 of the roller assembly 15*a* has a cam follower 76, 78 which rides on the outer set of cams 26 to close the assembly against the action of a spring 80 mounted on an axle 82 on the mounting bracket 50. In the closed position, as shown in FIG. 5*a,* the rollers 72, 74 retain and engage the sausage 16. In the open position, as shown in FIG. 5*b,* the upper pairs of rollers 74 are separated to allow loading and unloading of the sausage 16.

Rotation of the gear wheel 66, and thus the rollers 72, 74, is effected by movement of a rack 82 mounted in the bracket 50. The outer end of the rack 82 is provided with a cam follower 84 which engages a cam (not shown) mounted adjacent the circumference of the plate. In the illustrated example, movement of the rack 82 to the right produces counter-clockwise twisting of the sausage 16. Twisting of the sausage in the opposite, clockwise direction is achieved by reviewing the rack in the opposite direction i.e. to the left so as to produce clockwise twisting of the sausage.

Figure 6A:
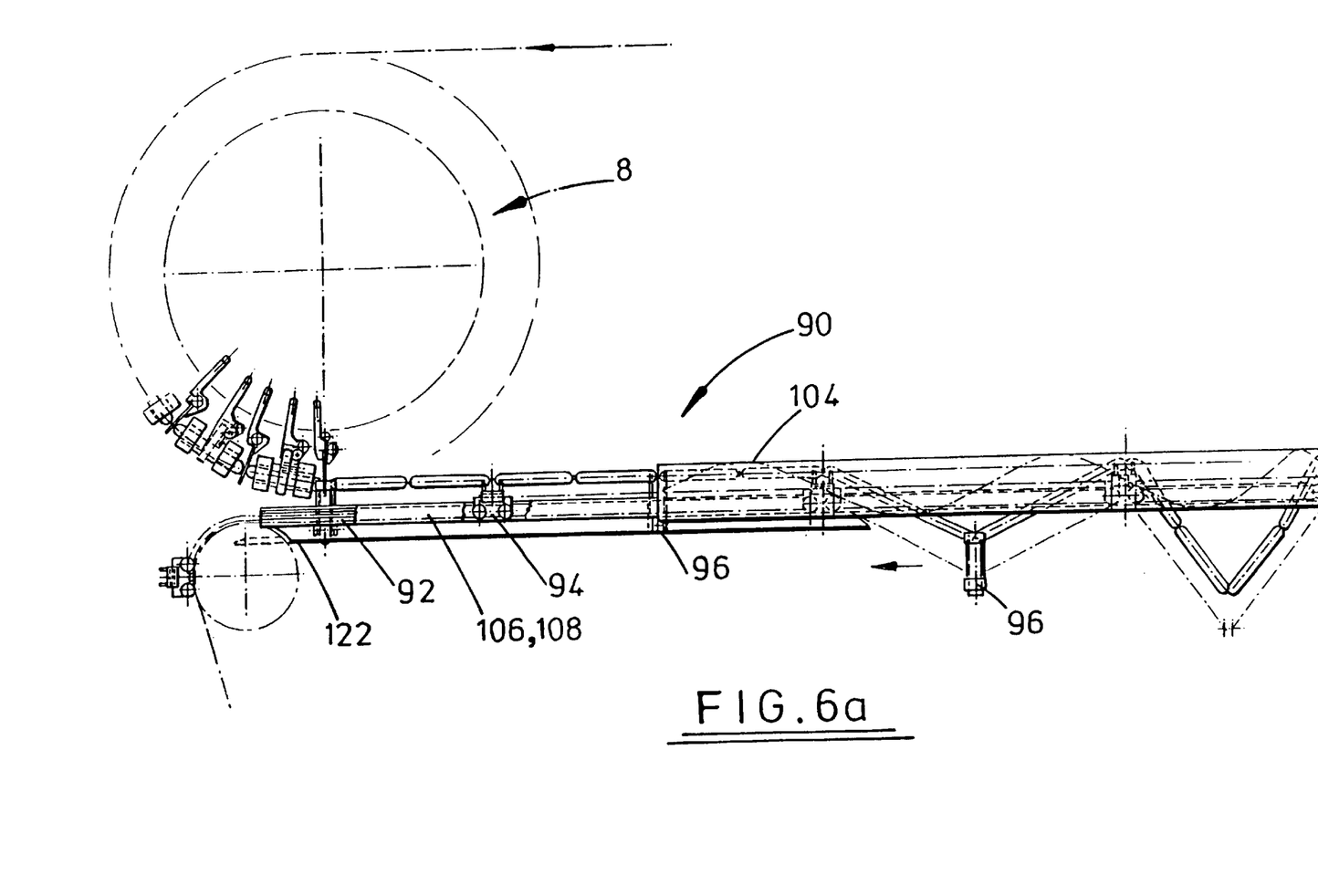
FIGS. 6a and 6b are somewhat schematic views of apparatus for arranging a longitudinal chain of sausage links in substantially vertical loops in accordance with a preferred embodiment of a still further aspect of the present invention.
Figure 6B:
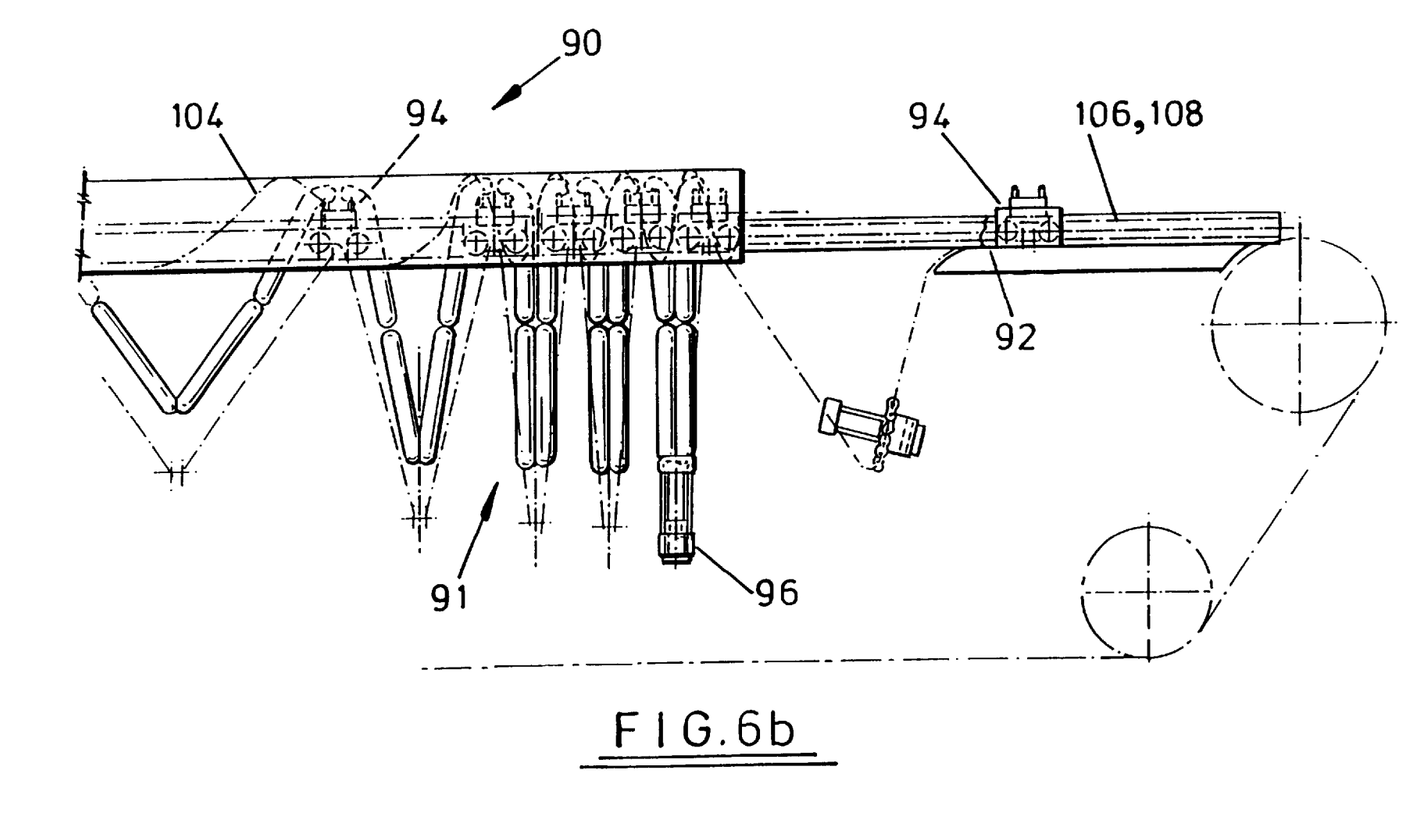

As mentioned above, the twisted chain of sausages produced by the apparatus 9 is passed from the pinch arms and roller assemblies on the plate 10 to a second conveyor 90, as shown in FIGS. 6*a* and 6*b* of the drawings (it will be noted that FIGS. 6*a* and 6*b* are drawn to different scales). The conveyor 90 receives the sausage chain as it is unloaded from the plate 10 and then arranges the chain in vertical hanging loops 91, as shown in FIG. 6*b*. The loops provide a convenient arrangement for manual unloading of the sausages, or for continuous further processing, such as curing.

The conveyor 90 includes a continuous roller chain 92 to which a plurality of supports and clamps 94, 96 are alternately mounted. Each adjacent support and clamp 94, 96 is spaced apart by two link lengths and, to avoid the twisted links unwinding, the clamps 96 are located to engage the chain adjacent the ends of the oppositely twisted sets of links.

Figure 7:
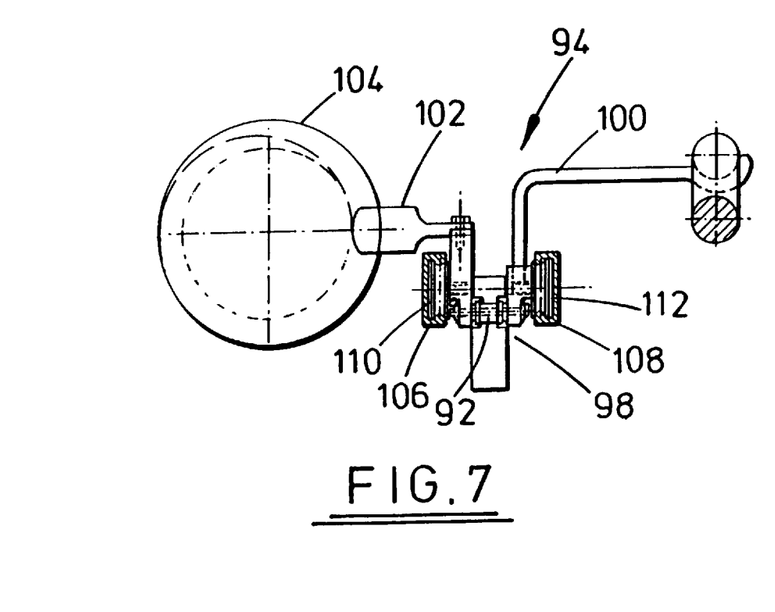
FIG. 7 is a view of a support member of the apparatus of FIG. 6a and 6b.

Each support 94, one of which is illustrated in FIG. 7 of the drawings, comprises a mounting member 98 for engaging the chain 92, the member 98 providing mounting for a pair of link supporting arms 100 (only one visible in FIG. 7) on one side of the chain 92 and a screw follower 102 on the other side of the chain 92. The follower 102 engages with a screw 104 which extends along the upper reach of the second conveyor path and provides the drive for the chain 92. The upper reach of the conveyor also includes a pair of rails 106, 108 which receive set of wheels 110, 112 mounted on the member 98.

Figure 8:
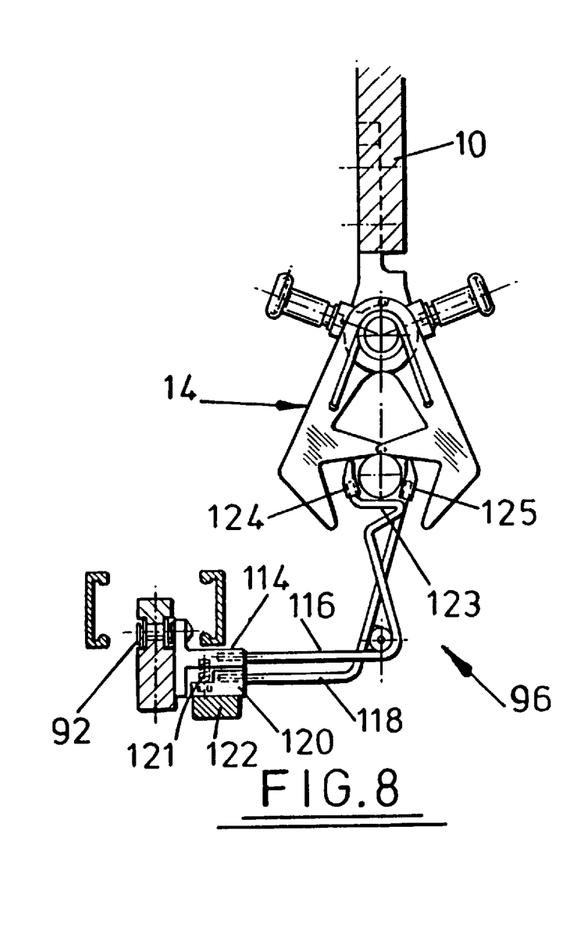
FIG. 8 is a view of a clamp arm assembly of the apparatus of FIGS. 6a and 6b.

Each of the clamps 96, one of which is illustrated in FIG. 8, is supported by the chain 92 and includes a member 114 attached to the chain 92. A wire clamp arm 116 is fixed to the member 114, a second clamp arm 118 being pivotally mounted on the first arm 116. The lower end of the second arm 118 is provided with a block 120 which is biased away from the opposing face of the member 114 by a spring. The arms 116, 118 are arranged such that the spring 121 biases the arms to a clamping configuration, the arms being opened to allow loading of the chain by the presence of a block deflecting rail 122, provided at the beginning of the upper reach of the conveyor, which forces the block 120 upwardly against the action of the spring 121. It will be noted from FIG. 8 that the first arm 116 includes a horizontal support portion 123, in addition to the clamping portion 124 opposing the clamping portion 125 on the other arm 118.

The pitch of the screw 104 decreases in the direction away from the loading station such that, with the movement from left to right as shown in the drawings, the supports 94 are brought closer together such that the chain 92, and the chain of sausage links between the supports 94, tend to form hanging loops 91, with the clamps 96 at the lower ends of the loops.

As the clamps 96 engage the sausage 16 between the sets of oppositely twisted links the four links between each clamp are unable to unwind, either in the extended position when initially loaded onto the second conveyor, or when arranged as a series of hanging loops.

The hanging loops provide a convenient and compact arrangement for further processing of the sausage, and also facilitate manual unloading of the sausage from the conveyor 90. The clamps 96 are released by passing over a further cam (not shown).

Although the embodiments described above relate to sausage links being handled in oppositely twisted sets of four links it is of course possible to form and handle other combinations of links. The term tubular casing filled with food emulsion would also cover any continuous co-extrusion product, such as collagen or alginate filled with a food emulsion. Further, the person of skill in the art will realise that the particular embodiments described above are merely exemplary of the present invention and that various modifications and improvements may be made to the invention without departing from the scope of the invention: for example, the rollers 72, 74 of the roller assemblies may be replaced with bands or belts; also the mounting plate 10 could be arranged to rotate around a vertical axis.

We claim:

1. Apparatus for forming a chain of sausage links from a tubular casing filled with a food emulsion, the apparatus comprising conveyor means including a plurality of pinching means for closing on the casing to form individual links and a plurality of twisting means for rotating the filled casing about a longitudinal axis relative to adjacent links to form twisted casing portions between the links, characterised in that the twisting means are arranged to rotate a first set of even numbers of a plurality of adjacent links in one direction and arranged to rotate a following second set of the same even number of adjacent links the opposite direction facilitate hanging of the chain in loops.

2. Apparatus as claimed in claim 1 characterised in that the conveyor means defines a continuous circular path.

3. Apparatus as claimed in claim 2 characterised in that said twisting means are disposed along substantially half of said circular path.

4. Apparatus as claimed in claim 1 characterised in that the pinching means are in the form of pinching arms arranged to open and close to receive, pinch and then release a portion of filled casing.

5. Apparatus as claimed in claim 4 characterised in that said arms include cam followers which cooperate with cams configured to provide a desired arm configuration at an appropriate point on a path followed by the conveyor means.

6. Apparatus as claimed in claim 4 characterized in that each set of pinching arms is provided with cam followers arranged to follow a respective cam to provide pinching arms having different opening and closing sequences to suit different requirements of twisting operations carried out on the first and second sets of links.

7. A method of forming a chain of sausage links from a tubular casing filled with a food emulsion, the method comprising the steps of: pinching the casing at spaced intervals to form individual links; and rotating the filled casing about a longitudinal axis relative to adjacent links to form twisted casing portions between the links, characterized in that a first set of even numbers of a plurality of adjacent links is rotated in one direction and a following second set of even numbers of adjacent links is rotated in the opposite direction to facilitate the hanging of the chain in loops.

8. A method as claimed in claim 7 characterised in that the method includes the step of twisting even numbers of adjacent links in alternate directions.

9. A method as claimed in claim 7 characterised in that the pinching and twisting operations are performed along a semi-circular path.

10. Apparatus for producing a string of individual sausages from a sausage filled casing, said apparatus comprising, a plurality of spaced gripping means for pinching the sausage filled casing, the distance between adjacent gripping means defining an individual sausage length, a plurality of sausage turning means, each sausage turning means being disposed between a pair of sausage gripping means and being operable to twist a gripped sausage about its longitudinal axis so that there is a twist in the sausage casing between adjacent sausages, means for moving the sausage filled casing through said plurality of gripping means and sausage turning means whereby gripping and turning operations are performed on said sausage filled casing to provide a string of sausages which includes a plurality of strands of sausages, each strand having an even number of sausages with at least four sausages per strand, and in which strand half of the sausages are twisted in one direction and the other half of the sausages are twisted in an opposite direction to facilitate banging of the string in loops.

11. A method of producing a string of sausages with a minimal tendency to untwist when hung vertically said method comprising the steps of, feeding a sausage filled casing having a longitudinal axis through a plurality of gripping and turning stations, providing the casing at selected stations to create individual sausages linked together by the casing, turning a first set of even numbers of sausages in one direction about a longitudinal axis, with each sausage in said first set being turned relative to each adjacent sausage, turning a second set of even numbers of sausages in the opposite direction with each sausage in said second set being turned relative to each adjacent sausage, said first and second sets of even numbers of sausages forming a strand of sausages, the arrangement being such that, said sausages are hung such that said first and second sets of sausages in each strand are arranged vertically with a minimal tendency to untwist.

* * * * *